United States Patent [19]
Kelbert et al.

[11] Patent Number: 5,205,692
[45] Date of Patent: Apr. 27, 1993

[54] THREE-AXES VARIABILITY COMPENSATING FASTENER

[75] Inventors: David L. Kelbert, Brighton; Richard T. Smith, Pinckney, both of Mich.

[73] Assignee: Ford Motor Company, Dearborn, Mich.

[21] Appl. No.: 876,157

[22] Filed: Apr. 30, 1992

[51] Int. Cl.$^5$ ............................................. F16B 37/02
[52] U.S. Cl. ................................... 411/173; 411/338
[58] Field of Search ............... 411/339, 338, 173, 177, 411/178, 269, 432, 389

[56] References Cited

U.S. PATENT DOCUMENTS

| | | |
|---|---|---|
| 1,229,911 | 6/1917 | Dodds . |
| 2,161,740 | 6/1939 | Eksergian . |
| 2,425,464 | 8/1947 | George . |
| 2,435,466 | 2/1948 | Thomas . |
| 3,531,142 | 9/1970 | Peasley ............................ 411/908 X |
| 3,943,818 | 3/1976 | Pryor et al. . |
| 4,043,239 | 8/1977 | DeFusco ......................... 411/432 X |
| 4,088,355 | 5/1978 | Dey . |
| 4,186,645 | 2/1980 | Zaydel . |
| 4,334,815 | 6/1982 | Knohl ............................. 411/389 X |
| 4,372,718 | 2/1983 | Zaydel . |
| 4,490,083 | 12/1984 | Rebish ............................ 411/907 X |
| 4,690,365 | 9/1987 | Miller et al. . |
| 4,715,756 | 12/1987 | Danico et al. ................... 411/542 X |
| 4,729,707 | 3/1988 | Takahashi . |
| 4,770,584 | 9/1988 | Vinciguerra . |
| 4,925,364 | 5/1990 | Das . |
| 5,085,549 | 2/1992 | Londry . |

FOREIGN PATENT DOCUMENTS

| | | |
|---|---|---|
| 3544423 | 6/1987 | Fed. Rep. of Germany ...... 411/533 |
| 721573 | 3/1980 | U.S.S.R. . |
| 23407 | of 1906 | United Kingdom . |
| 1046456 | 10/1966 | United Kingdom ................ 411/542 |

*Primary Examiner*—Rodney M. Lindsey
*Attorney, Agent, or Firm*—Raymond L. Coppiellie; Roger L. May

[57] ABSTRACT

An apparatus for securing a component to a panel to provide variable positioning of the component with respect to three mutually perpendicular axes is disclosed, having an elongate threaded stud, a generally planar member with a cylindrical elongate collar projecting therefrom, the collar being threadably engaged with the stud threads and including threads of an opposite direction on an outer surface thereof. The apparatus also comprises an internally threaded fastener for threadedly engaging the external threads of the collar. The internally threaded fastener and the planar member clampingly engage respective opposite sides of the panel upon tightening of the nut and permit variable positioning of the component with respect to the panel along three mutually perpendicular axes without moving the component.

11 Claims, 2 Drawing Sheets

THREE-AXES VARIABILITY COMPENSATING FASTENER

BACKGROUND OF THE INVENTION

1. Field of the Invention

The present invention relates generally to fasteners and more specifically to fastening systems accommodating a variability in fastening position.

2. Disclosure Information

In the automotive fastening arts, the wide variability in the positioning of structures to be fastened together necessitates the accommodation of a stack-up of tolerances between automotive body structure and the components that are assembled to an automotive body. U.S. Pat. No. 5,085,549, assigned to the assignee of the present invention, discloses a mounting system which overcomes the stack-up of tolerances and accommodates variability in positioning the componentry with respect to the panel to which it is attached. The mounting system of the '549 patent includes a stud carried with the component to be mounted, a hole formed through the body structure for receiving the stud therein and a fastener assembly that is both axially variable positionable with respect to the stud and carried within the hole which permits movement along axes perpendicular to the stud. The fastener assembly provides for clamping engagement with the body structure to secure the stud and the component in its final desired position. The stud of the '549 system engages a collar which is axially positionable in a conical spring washer. External and internal tapered surfaces of the collar wedgingly engage the washer to provide locking engagement with respect to the stud when the appropriate axial position is reached. Because of the frictional locking engagement provided by the '549 system, its utility is limited to light duty applications in non-harsh atmospheres.

SUMMARY OF THE INVENTION

The present invention provides an improvement to the mounting system of the '549 system by providing a three axes variability compensating fastener which allows for even more precise and accurate axial positioning along the stud elongation axis. The present invention accomplishes this by providing an apparatus for securing a component to a panel to provide variable positioning of the component with respect to three mutually perpendicular axes, the apparatus comprising an elongate, threaded stud, having a first shank portion for threaded attachment to the component, a second shank portion and a flange formed integrally therebetween. The apparatus further comprises a generally planar member adapted to be positioned axially intermediate one side of the panel, the member having a generally cylindrical, elongate collar projecting perpendicularly from the plane of the member. The collar has internal threads formed therein for threaded attachment along the length of the stud second shank portion and external threads formed in an opposite direction on an outer surface thereof, the collar being adapted to be inserted into an aperture formed in the panel, the aperture being sized to provide substantial diametrical clearance about the collar outer surface. The apparatus also includes an internally threaded fastener threadedly engageable with the external threads of the collar and abuttingly engageable with an opposite side of the panel, whereby upon tightening the fastener, the planar member and fastener clampingly engage the panel to secure the component in a desired position in two axes and the stud is variably positionable along its axis of elongation in a third mutually perpendicular axis.

It is an advantage of the present invention to provide automatic positioning and alignment of the fastening system without preloading the component or the stud attached thereto. It is also an advantage of the present invention in that this attachment is positive and will not be affected by long periods of suspended weight subjected to much vibration or environmental conditions such as are present in an automotive underhood environment.

It is a further advantage of the present invention to provide watertight sealing between the opposite sides of the panel to which the component is attached.

DETAILED DESCRIPTION OF THE PREFERRED EMBODIMENTS

Figure 1:
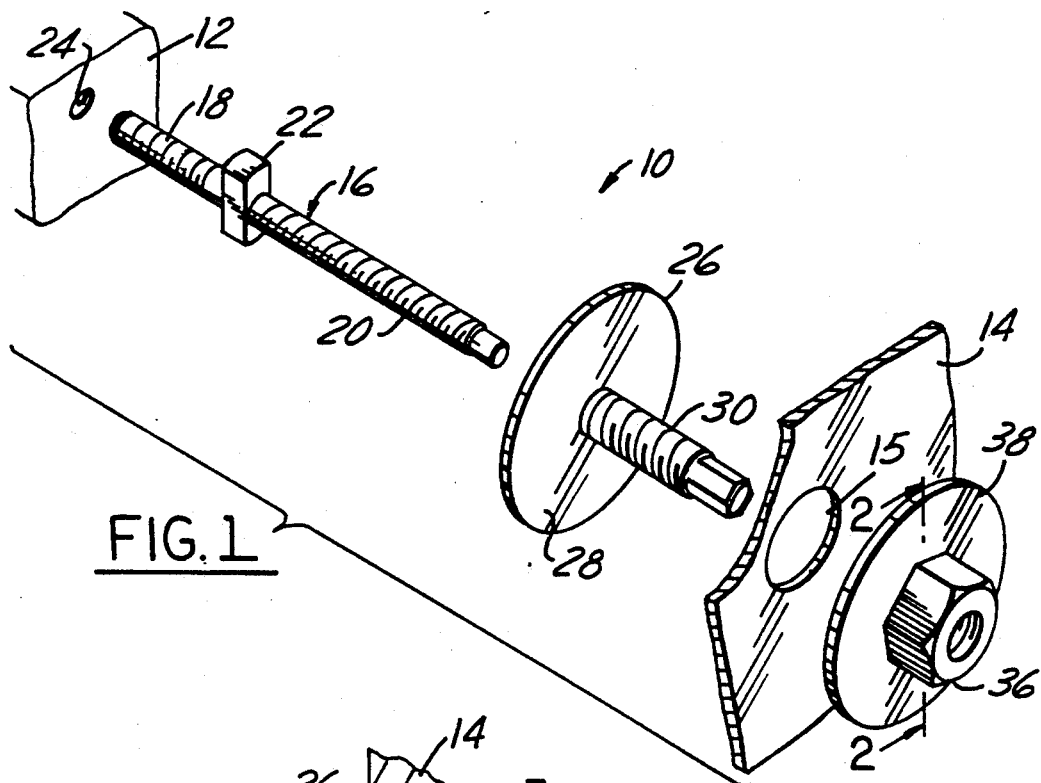
FIG. 1 is an exploded view of an apparatus according to the present invention.

Referring now to the drawings, FIG. 1 shows a mounting assembly, generally designated at 10, of the present invention for securing a component 12 to a panel 14 mounted, for example, in a vehicle. The mounting assembly 10 has particular use in mounting air conditioning components, such as an evaporator case assembly, to the firewall of the vehicle. The component 12 is mounted to the panel 14 through hole 15.

The mounting assembly 10 includes an elongated stud 16 having a first shank portion 18 and a second shank portion 20. An integrally formed flange 22 separates the first and second shank portions The first shank portion 18 threadably engages a threaded aperture 24 in the component 12. In the preferred embodiment, the stud 16 is threaded with left hand threads. The assembly 10 further includes a thrubolt 26 which comprises a generally planar member 28 and an elongate, cylindrical collar 30 projecting perpendicularly from the plane of member 28. The member 28 may be configured in a variety of different shapes, the preferred embodiment comprising a circular or disk-shaped configuration. The thrubolt 26 may be fabricated in any of a number of known processes, such as a stamping for a metal member or through an injection molded process for a thrubolt manufactured from a synthetic elastomeric material, such as glass filled nylon or glass filled polyamide.

Figure 3:
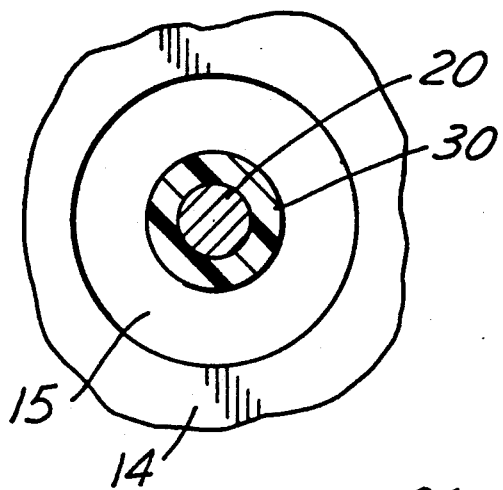
FIG. 3 is a cross-sectional view along line 3—3 of FIG. 2.

The cylindrical collar 30 is integrally formed with the planar member 28 and includes internal threads formed therein for threaded attachment along the length of the stud second shank portion 20. The collar 30 is variably axially positionable with respect to the second shank portion 18 of stud 16. The collar 30 also includes an outer surface having external threads formed thereon, the external threads being formed in a direction opposite to the threads of the stud 16. In the preferred embodiment, the external threads of collar 30 are right handed threads. The present invention also contemplates that the reverse may be true, i.e. the threads of stud 16 may be right hand threads and the threads of the external surface of the collar 30 would then be left hand threads. The collar is configured to be inserted through hole 15 of panel 14. As shown in FIG. 3, the hole is sized to provide substantial diametrical clearance about the collar outer surface to permit movement of the collar along two axes perpendicular to the elongation axis of the stud.

Figure 2:
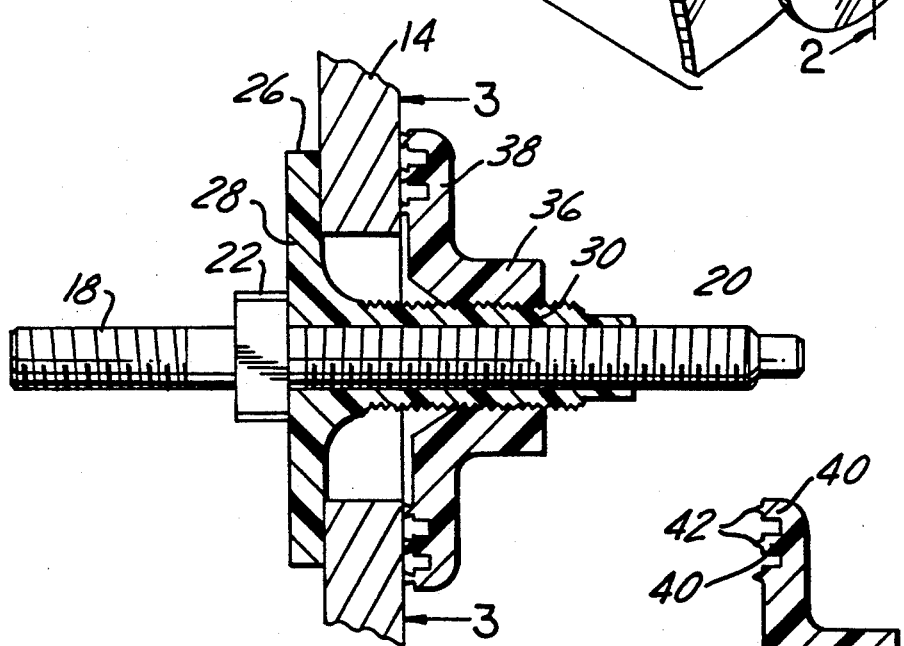
FIG. 2 is a cross-sectional view of the apparatus of FIG. 1 in its assembled condition.
Figure 2A:
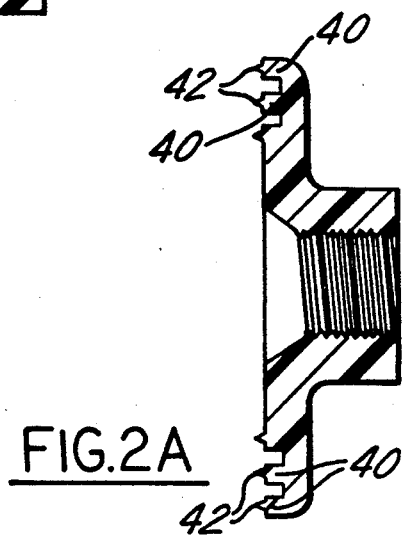
FIG. 2A is a cross-sectional view taken along line 2—2 of FIG. 1

The assembly 10 further includes an internally threaded fastener, such as nut 36 which is integrally formed to a load distribution washer 38. As shown in FIG. 2, the internal threads of nut 36 threadably engage the threads of outer surface of collar 30 so that upon tightening nut 36, the planar member 28 of thrubolt 26 and the washer 38 of nut 36 clampingly engage panel 14. When the collar 30 is appropriately radially positioned within the diametrical clearance between the outer edges of hold 15 of panel 14, clamping engagement is effected by tightening the nut 36 which draws the planar member 28 of thrubolt 26 into abutting engagement with the opposite side of panel 14. The planar member 28 and washer 38 are configured to completely enclose hole 15 to prevent passage of undesirable contaminants through hole 15. As shown in FIG. 2A, washer 38 includes a plurality of ribs 40, each ending in a deformable projection tip 42. As nut 36 is tightened against panel 14, tips 42 flatten to form a sealing flange as shown at 44 in FIG. 2. Sealing flange 44 provides a water tight seal between opposite sides of panel 14. Alternatively, as shown in FIG. 4, an elastomeric sealing member 46 can be molded to or secured to the washer 38 to provide a watertight seal between opposite sides of panel 14.

Figure 4:
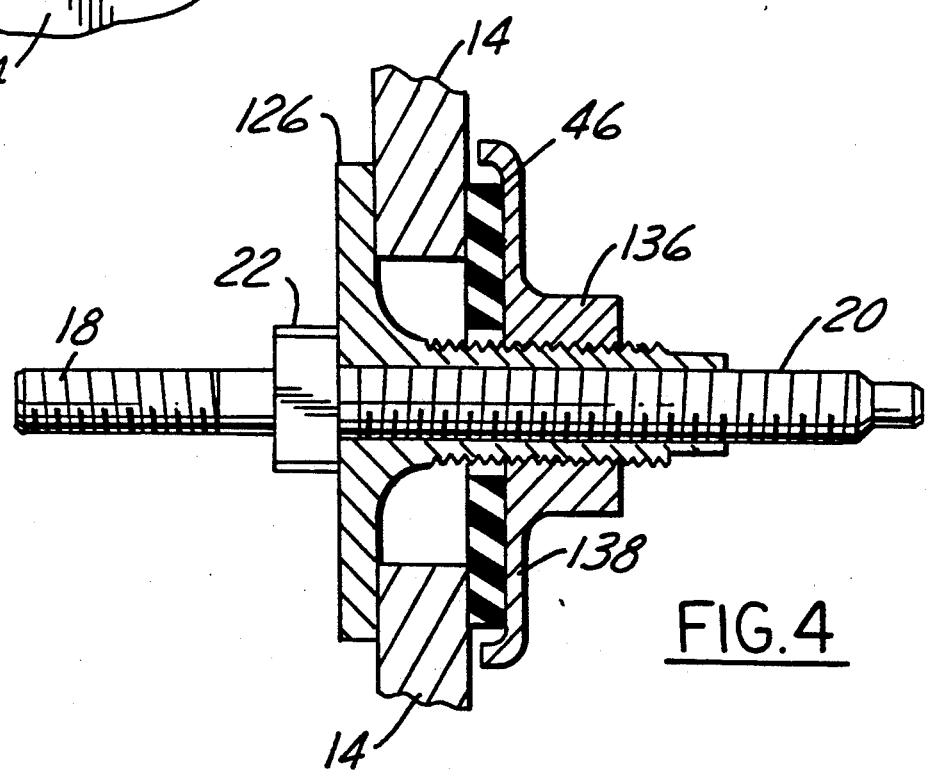
FIG. 4 is a cross-sectional view similar to FIG. 2 of an alternative embodiment of the apparatus of the present invention.

The alternative embodiment of FIG. 4 differs from that of FIGS. 1 and 2 in the respect that the thrubolt 126 and the nut 136 are formed of metal and includes an integrally molded seal 40 attached to washer 138. As stated above, the thrubolt 126 and nut 136 may also e formed in any of a number of known fabrication processes, as well as from a number of known materials such as nylon or polyamide.

In operation, the first shank portion 18 of stud 16 is threaded into aperture 24 of component 12 until the flange 22 contacts component 12. Thrubolt 26 is then threaded onto the second shank portion 20 of stud 16 until planar member 28 contacts the opposite side of flange 22. The collar 30 of thrubolt 26 is then placed through hole 15 of panel 14. The component location can then be adjusted with respect to an axis parallel to the elongation axis of the stud by turning the stud relative to collar 30 or vice versa. The collar 30 can then be positioned within hole 15 to its desired location along the two axes perpendicular to the elongation axis of the stud 16. The nut 36 is then threadably engaged with the outer threads on collar 30 and tightened until planar member 28 of thrubolt 26 and washer 38 of nut 36 clampingly engage respective opposite sides of panel 14 without moving stud along the elongation axis of stud 16. Before the final tightening is completed, the component may be positioned within the diametrical clearance of hole 15 to achieve the desired location.

It will be appreciated by those skilled in the fastener arts that manual or robotic manipulation of nut 36 can be utilized to tighten the nut 36 from only one side of panel 14.

While only two embodiments of the invention fastening or mounting assembly are disclosed, others may be possible without departing from the scope of the appended claims.

What is claimed is:

1. An apparatus for securing a component to a panel to provide variable positioning of the component with respect to three mutually perpendicular axes, said apparatus comprising:

an elongate, threaded stud having a first shank portion for threaded attachment to said component, a second shank portion and a flange formed integrally therebetween;

a generally planar member adapted to be positioned axially intermediate one side of said panel, said member having a generally cylindrical, elongate collar projecting perpendicularly from the plane of said member, said collar having internal threads formed therein for threaded attachment along the length of said stud second shank portion and external threads formed in an opposite direction on an outer surface thereof, said collar being adapted to be inserted into an aperture formed in said panel, said aperture being sized to provide substantial diametrical clearance about said collar outer surface; and an internally threaded fastener threadedly engageable with said external threads of said collar and abuttingly engageable with an opposite side of said panel and operative, upon tightening said fastener, to draw said planar member against said panel to secure said component in a desired position in two axes and wherein said stud is variably positionable along its axis of elongation in a third mutually perpendicular axis.

2. An apparatus according to claim 1, wherein said generally planar member is disc-shaped.

3. An apparatus according to claim 1, further including sealing means carried by said fastener to seal said aperture upon clamping engagement of said planar member and said fastener to said panel.

4. An apparatus according to claim 3, wherein said internally threaded fastener comprises a nut formed of resilient plastic material formed integral with a generally planar circular disc.

5. An apparatus according to claim 4, wherein said sealing means comprises a plurality of projection tips extending from a plurality of ribs formed on said circular disc an operative to engage said panel.

6. An apparatus according to claim 1, wherein said stud includes left-handed threads and said outer surface of said collar includes right-handed threads.

7. An apparatus according to claim 1, wherein said stud includes right-handed threads and said outer surface of said collar includes left-handed threads.

8. An apparatus for securing a component to a panel to provide variable positioning of the component with respect to three mutually perpendicular axes, said apparatus comprising:

an elongate, threaded stud having a first shank portion for threaded attachment to said component, a second shank portion and a flange formed integrally therebetween;

a generally planar member adapted to be positioned axially intermediate one side of said panel, said member having a generally cylindrical, elongate collar projecting perpendicularly from the plane thereof, said collar having internal threads formed therein for threaded attachment to said stud second shank portion such that said stud is variably axially positionable along its axis of elongation, and external threads formed in an opposite direction on an outer surface thereof, said collar being adapted to be inserted into an aperture formed in said panel, said aperture being sized to provide substantial diametrical clearance about said collar outer surface;

an internally threaded nut threadedly engageable with said external threads of said collar formed integrally with a generally planar disc adapted to abuttingly engageable an opposite side of said panel, said disc including a plurality of ribs integrally formed on one side thereof, each of said ribs including a deformable projection tip operative to flatten and seal said aperture upon clamping engagement of said planar member and said nut to said panel, whereby upon tightening said nut, said planar disc is drawn against said panel to clampingly engage said panel to secure said component in a desired position.

9. An apparatus according to claim 8, wherein said stud includes left-handed threads and said outer surface of said collar includes right-handed threads.

10. An apparatus according to claim 8, wherein said stud includes right-handed threads and said outer surface of said collar includes left-handed threads.

11. A mounting system for securing a component to a panel, comprising:

an elongate, left-hand threaded stud having a first shank portion for threaded engagement with said component, a second portion and a flange formed integrally therebetween;

a hole formed through the panel being sized to permit insertion of the stud along its axis of elongation to provide substantial diametrical clearance therebetween;

a fastener assembly variably axially positionable along the stud axis of elongation, carried within the diametrical clearance and clampingly secured to the panel to provide variable positioning of the component with respect to three mutually perpendicular axes, said fastener comprising:

a generally planar member adapted to be positioned axially intermediate one side of said panel, said member having a generally cylindrical, elongate collar projecting perpendicularly from the plane thereof, said collar having internal threads formed therein for threaded attachment along the length of said stud second shank portion and external right-hand threads formed on an outer surface thereof, said collar being adapted to be inserted into said hole;

an internally threaded nut threadedly engageable with said external threads of said collar, said nut being formed integrally with a generally planar disc adapted to abuttingly engageable an opposite side of said panel, said disc including a plurality of ribs molded integrally therewith, each rib including a deformable projection top extending therefrom and operative to seal said aperture upon clamping engagement of said planar member and said nut to said panel, whereby upon tightening said nut, said planar member and said disc are drawn against said panel to clampingly engage said panel to secure said component in a desired position and said projection tips are flattened against said panel to provide watertight sealing around said hole.

* * * * *